United States Patent Office 3,206,376
Patented Sept. 14, 1965

3,206,376
METHOD OF DETERMINING GLUTAMIC-OXALACETIC TRANSAMINASE
Arthur L. Babson, Morris Plains, N.J., assignor to Warner-Lambert Pharmaceutical Company, Morris Plains, N.J., a corporation of Delaware
No Drawing. Filed May 22, 1964, Ser. No. 369,603
9 Claims. (Cl. 195—103.5)

This application is a continuation-in-part of application Serial No. 176,807, filed March 1, 1962, now abandoned.

The present invention relates to a new and novel method of determining the amount in body fluids of the enzyme glutamic-oxalacetic transaminase and to a composition for use in said determination.

The enzyme glutamic-oxalacetic transaminase is so named because of its ability to catalyze the rate of the reversible reaction of α-ketoglutaric acid and L-aspartic acid to form L-glutamic acid and oxalacetic acid.

This reaction, in which an amino group is shifted from one molecule to another, is the following:

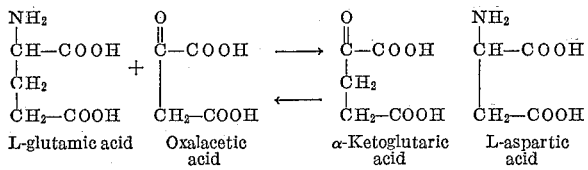

The reaction rate is directly proportional to the concentration of the enzyme glutamic-oxalacetic transaminase in the reaction medium. This enzyme is known to be released within the body in certain types of cell destruction and for this reason the measurement of the enzyme concentration is a valuable aid in the diagnosis of diseases where such cell destruction takes place as, for example, myocardial infraction, intrahepatic lymphoma or carcinoma, hepatitis, cirrhosis and the like. This enzyme is released into body fluids, such as the blood, spinal fluid and the like. It is most commonly measured in blood serum which is the liquid fraction obtained by centrifuging clotted whole blood.

All the methods currently known for determining the concentration of this transaminase enzyme is body fluids, for example, blood serum, depend on the measurement of the rate of the above chemical reaction, by measuring the the rate of formation or disappearance of one of the compounds taking part in the reaction. One presently used method is based upon the fact that oxalacetic acid (formed by the reaction of α-ketoglutaric acid and L-aspartic acid in the presence of glutamic-oxalacetic transaminase) reacts with the reduced form of the coenzyme diphosphopyridine nucleotide (DPNH) in the presence of malic dehydrogenase to form diphosphopyridine nucleotide (DPN) and malic acid. Since DPNH has a characteristic ultraviolet absorption band at 340 mμ, the measurement of the rate at which the optical density changes is directly proportional to the rate at which oxalacetic acid is formed and thus proportional to the concentration of glutamic-oxalacetic transaminase in the serum being tested. Although this method is accurate and reliable, it requires the use of an ultraviolet spectrophotometer to measure the optical density at 340 mμ. Since many small laboratories do not have such an instrument, this method does not have the widespread applicability desirable in a diagnostic aid.

Another method in use depends on the reaction of oxalacetic acid (formed in the above-described transaminase catalyzed reaction) with 2,4-dinitrophenylhydrazine to form a dinitrophenylhydrazone of oxalacetic acid which absorbs light in the visible spectrum. Thus, this method does not require an ultraviolet spectrophotometer. However, the α-ketoglutaric acid of the substrate also forms a dinitrophenylhydrazone derivative which absorbs light in the same general region of the visible spectrum as does the dinitrophenylhydrazone of oxalacetic acid. This results in a large "blank" reading due to the optical density of the substrate and, consequently, the method depends on measuring small differences between large numbers, which is generally an unfavorable parameter for obtaining accurate results.

Attempts to overcome this problem have not been entirely successful. By limiting the amount of α-ketoglutaric acid in the substrate, the "blank" reading is reduced, but this may result in insufficient substrate being present. In all enzymatic reactions, particularly those involving a reversible reaction, it is essential that the substrate be present in large excess. An alternative procedure involves extraction of the oxalacetic acid dinitrophenylhydrazone from the reaction mixture with a solvent such as toluene. This procedure is sound in theory but involves many manipulative steps and is thus not practical for routine and rapid analyses by small laboratories.

There has long been a need for a rapid and accurate method of determining the concentration of the enzyme glutamic-oxalacetic transaminase in blood serum or other body fluids which can be carried out on a routine basis in small laboratories by relatively unskilled technicians without the need for special equipment.

It is, therefore, an important object of the present invention to provide a rapid and accurate method of determining the concentration in a small volume of a body fluid of glutamic-oxalacetic transaminase.

It is a further object of this invention to provide a method of determining the concentration of glutamic-oxalacetic transaminase in blood serum which can be carried out on a routine basis without special equipment by even unskilled personnel.

Yet another object of this invention is to provide a novel substrate composition for use in the determination of the concentration of the enzyme glutamic-oxalacetic transaminase in body fluids.

Other objects and the advantages of the present invention will become apparent from the following detailed description.

It has now been found that the rate of the reaction of L-aspartic acid with α-ketoglutaric acid catalyzed by the enzyme glutamic-oxalacetic transaminase present in unknown amount in a body fluid, and thus the concentration of this enzyme in the body fluid, may be determined by measuring the depth of color developed by the coupling of a color-forming azonium salt with the oxalacetic acid formed as a product of the reaction. In accordance with one embodiment of this invention, a small volume of the body fluid to be tested is incubated with a substrate comprising L-aspartic acid and α-ketoglutaric acid and then a color-forming azonium salt is added so as to form a visible color whose depth is proportional to the concentration of the enzyme in the body fluid. Since the color produced is in the visible portion of the spectrum, a complex ultraviolet spectrophotometer is not required and, since the azonium salt couples only with oxalacetic acid, this procedure enables this measurement to be carried out with a high degree of accuracy.

The method of this invention is adapted to the determination of the enzyme glutamic-oxalacetic transaminase in any body fluid, including spinal fluid, blood serum and the like. Since this enzyme is most commonly determined in blood serum, this is the body fluid usually used in this procedure. The blood serum is separated from clotted whole blood by centrifugation in accordance with conventional procedures.

In accordance with the above mentioned embodiment of this invention the substrate for the above determination of glutamic-oxalacetic transaminase is a buffered mixture of L-aspartic acid and α-ketoglutaric acid which is added to a small volume of the body fluid to be tested. The novel method of this invention is adaptable to the accurate measurement of glutamic-oxalacetic transaminase in as little as 0.1 ml. of body fluid. The substrate employed need only contain α-ketoglutaric acid and L-aspartic acid as the active components and the latter may be added either as the pure L- form or as the racemic mixture, D,L-aspartic acid. The amounts present are not critical, with the exception that a substantial excess of each should be present.

The buffered substrate also include alkaline buffering materials in order to overcome the acidity of the substrate and to maintain the pH of the medium between about 6.5 and 8.0 and preferably at pH 7 to 7.5 during the incubation in which the oxalacetic acid is liberated. The latter is the optimum pH for the activity of the enzyme. Useful buffers include trisodium phosphate, sodium barbital, tris(hydroxymethyl) - aminomethane and the like. The ingredients of the buffered substrate may be prepared in the form of an aqueous solution or formulated into a tablet including inert pharmaceutical diluents such as lactose, leucine or stearic acid. When a substrate in tablet form is used, the tablet is, of course, first dissolved in a small volume of water before reaction with the body fluid.

It has also been found that the use of a protective colloid such as polyvinylpyrrolidone in the substrate is highly advantageous.

The advantage of incorporating polyvinylpyrrolidone in the substrate lies in the fact that the added polyvinylpyrrolidone acts to stabilize the color formed when the oxalacetic acid produced in the substrate upon incubation of the test mixture couples with the azonium salt color developer which is added. At high enzyme concentrations the colored product formed by the coupling reaction tends to precipitate from solution thus leading to an inaccurate reading. By including polyvinylpyrrolidone in the substrate where it acts as a protective colloid, the colored product formed is stabilized in the medium thus enabling the color intensity to be determined reliably and with precision.

In carrying out the method of this invention the mixture of substrate and body fluid is incubated for a controlled time at a constant temperature within the range of about 25° to about 40° C. to permit the desired reaction to proceed and the oxalacetic acid to be liberated. The temperature and time of incubation may be varied, with a period of 15 to 30 minutes at about 37° C. being preferred. With lower temperatures, longer times are required while with higher temperatures, more rapid reaction is obtained. For reproducible results, of course, uniform incubation conditions should be maintained for every determination.

At the conclusion of the incubation, if the color-forming azonium salt is not satisfactorily stable at the temperature at which the incubation was carried out, the incubated mixture is preferably cooled to a temperature between about 10° C. and about 20° C. Such cooling is also desirable inasmuch as it serves to slow substantially the enzymatic reaction in the substrate and thus to prevent significant formation of additional oxalacetic acid during the coupling step. Cooling to a lower temperature is also desirable when the azonium salt which is added should be stabilized against decomposition.

After cooling there is then added the color-forming azonium salt which couples with the oxalacetic acid formed in the substrate during the incubation period. Useful azonium salts which form a colored coupling product with oxalacetic acid are, for example, 4-amino-2,5-diethoxybenzanilide diazonium chloride, diazotized 2-amino-4-chloroanisole, diazotized 5-chloro - o - toluidine, p-chloro-o-toluidine diazonium chloride, diazotized 4-benzoylamino - 2,5 - dimethoxyaniline, 6 - benzamido - 4-methoxy-m-toluidine diazonium chloride, 4-benzamido-2,5-diethoxyaniline diazonium chloride, tetrazotized o-dianisidine and the like. It has been found that 4-amino-2,5-diethoxybenzanilide diazonium chloride and 6-benzamido-4-methoxy-m-toluidine diazonium chloride are particularly effective salts for use in the invention since they form distinctive blue and red colored coupling products, respectively, with oxalacetic acid.

A particular advantage in the use of 6-benzamido-4-methoxy-m-toluidine diazonium chloride resides in the fact that it couples with the oxalacetic acid formed at the pH of optimum transaminase activity. Further, since it is sufficiently stable to be useful at 37° C. the temperature of incubation, any cooling of the reaction mixture prior to the addition of the color-forming azonium salt is unnecessary. The color which forms, furthermore, has a broad absorption peak which can be adequately measured by colorimetry.

With 4-amino-2,5-diethoxybenzanilide diazonium chloride, a pH of about 9 is particularly effective for coupling. With 6-benzamido-4-methoxy-m-toluidine diazonium chloride, a pH of about 7.4 is particularly effective. It has been found that when a buffer is required sodium barbital is preferred, although other alkaline buffers such as trisodium phosphate, tris(hydroxymethyl)aminomethane and the like may also be used.

After the addition of the azonium salt, the mixture is allowed to stand for a measured amount of time, which may be but a few minutes in order to permit the coupling reaction to proceed and the resulting color is then either compared with a standardized color chart or placed in a cuvette for the measurement of optical density by means of a standard spectrophotometer. The concentration of glutamic-oxalacetic transaminase in the unknown body fluid is determined by a comparison of the developed color, determined visually or in a spectrophotometer, with standards obtained by carrying out the test procedure with fluids containing known amounts of oxalacetic acid or of the enzyme.

It has also been found that resulting color may be further stabilized. Without specific stabilization of the developed color the color tends to increase, due probably to the instability of the diazonium salt at the pH of the reaction and to residual transaminase activity. While this phenomenon is not a problem if the final color produced is measured at once, where a large number of assays are being carried out simultaneously this poses some difficulties. Accordingly, a preferred embodiment of this invention is directed to the stabilization of the color formed. This color stabilization can be effectively attained by the addition of an aqueous acid to the resulting colored solution to give a pH of not more than 2.5 after the color has developed upon incubation as described above. Mineral acids such as, for example, hydrochloric, sulfuric, phosphoric, nitric and the like are preferred. Generally, a 0.01 to 0.05 N aqueous solution of the selected mineral acid is employed and the aqueous acid solution added in sufficient quantity to yield a pH of about 1 to 2 in the incubated substrates. Organic acids such as acetic, benzoic and the like may be employed to produce the desired pH but are employed at much higher strength, e.g., 1 N. Although the addition of the acid stabilizes the color it also reduces the intensity somewhat and this reduction in color intensity may be restored by the inclusion of a nonionic surface active agent in the medium. Suitable nonionic surface active agents are, for example, polyoxyethylene sorbitan monoleates, ethoxylated fatty alcohols, ethoxylated fatty acids or ethoxylated octylphenols. Generally, tridecyl alcohol condensed with 6 to 10 mols of ethyleneoxide or octylphenol condensed with 40 mols of ethyleneoxide are preferred because of their ready miscibility with water. These surface active agents may be included in the aqueous acid diluent in a concentration of about 0.5 to 1% by weight. The useful surface active agents are not limited to those enumerated above and many other nonionic surface active agents commonly used in the cosmetic and pharmaceutical art may also be employed. The ethoxylated fatty alcohols are available commercially as the "Lipals" (Drew Chemical) whereas the ethoxylated octylphenols are available under the "Triton" trade name (Rohm & Haas). The polyoxyethylene sorbitan monoleates are available as Polysorbate 80 or Polysorbate 20.

The addition of aqueous acid or an aqueous acid solution containing the desired nonionic surface active agent produces a remarkable stabilization of color so that no substantial change in optical density occurs even on standing over a long period.

Where the color-forming azonium salt employed is one which is stabilized during its preparation by being precipitated, for example, as a zinc chloride double salt, or other heavy metal salt, the inclusion of a sequestering agent capable of complexing with the zinc or other heavy metal ion present is highly advantageous since the sequestration of the zinc ions prevents the development of a cloudy solution when the azonium salt color developer is added to the incubated substrate.

To carry out the test in accordance with this invention 0.2 ml. of serum are added to 1.0 ml. of substrate at 37° C. and the mixture is incubated at this temperature for exactly 20 minutes. 1.0 ml. of color developer solution is added, the mixture maintained at 37° C. for 10 minutes, then diluted with 10 ml. of the aqueous acid diluent obtained in accordance with the above procedure and the optical density of the color developed is recorded at 530 m$\mu$. The transaminase activity of the serum is determined by reference to a standard curve.

In order to demonstrate the effect of said aqueous acid diluent on the stability of the developed color, the following table of comparative results is included in which the acid diluent is added in sufficient quantity to reduce the pH below 2.5:

TABLE I

*Effect of diluents on color stability*

| Diluent | Optical Denisty at 530 m. at— | | |
|---|---|---|---|
| | Zero time | 30 minutes | 60 minutes |
| Water: | | | |
| Sample 1 | .392 | .448 | .512 |
| Sample 2 | .392 | .449 | .516 |
| Blank | .070 | .097 | .128 |
| 0.02 N HCl: | | | |
| Sample 1 | .336 | .332 | .336 |
| Sample 2 | .344 | .345 | .342 |
| Blank | .062 | .062 | .063 |
| 0.02 N HCl+0.5% Lipal 610: | | | |
| Sample 1 | .388 | .385 | .385 |
| Sample 2 | .392 | .394 | .392 |
| Blank | .058 | .060 | .061 |

It is clear from the results tabulated above that the addition of an aqueous acid diluent or the addition of an aqueous acid diluent containing a nonionic surface active agent results in a remarkable improvement in the stabilization of the final color. It also shows that the addition of acid alone, although it stabilizes the color, results in a reduction in color and thus reduction in color is readily restored by the presence of a nonionic surface active agent.

Color developer solutions, containing any other of the color producing diazonium salts indicated above may also be employed.

The method of this invention provides a rapid, accurate and simple procedure for measuring the concentration of glutamic-oxalacetic transaminase in blood serum or other body fluids. The method provides an accuracy and simplicity not attainable by methods heretofore known since the azonium salts employed form a colored coupling product only with the oxalacetic acid formed and not with any other ingredient present in the incubated test mixture. The product of the coupling reaction has a visible color so that usage of a complex ultraviolet spectrophotometer is not required.

The following example is included in order further to illustrate the invention.

EXAMPLE 1

A substrate for use in accordance with the present invention is prepared by dissolving 146.1 mg. of a α-ketoglutaric acid, 532.4 mg. of L-aspartic acid, 5.68 g. of $Na_2HPO_4$, 2 g. of polyvinylpyrrolidone and 0.2 g. of ethylenediamine tetraacetic acid, tetra sodium salt, in 50 ml. of water and then diluting the solution to 200 ml. with water. The buffered solution thus obtained has a pH of 74. A color developer solution is then prepared by dissolving 125 mg. of 6-benzamido-4-methoxy-m-toluidine diazonium chloride in 25 ml. of distilled or deionized water.

The desired color developer may be based upon color producing diazonium salts other than 6-benzamido-4-methoxy-m-toluidine diazonium chloride and may be salts such as, for example, diazotized 2-amino-4-chloroanisole, 2-amino-4-nitroanisole, diazotized 5-chloro-o-toluidine, p-chloro-o-toluidine diazonium chloride, diazonium chloride, diazotized 3-chloro-4-benzamido-5-methoxyaniline, 4-benzamido-2,5-diethoxyaniline diazonium chloride, tetraazotized o-dianisidine, tetrazotized 6-dianisidine(3,3'-dimethoxybenzidine) and diazotized 4-benzoylamino-2,5-dimethoxyaniline may be employed in a like manner.

To prepare the acid diluent for use in accordance with the present invention 1.7 ml. of concentrated hydrochloric acid are mixed with either 5 ml. of Lipal 610 (tridecyl alcohol condensed with 6–10 mols of ethylene oxide) or Triton X–405 (octylphenol condensed with 40 mols of ethylene oxide) available in the form of a 70% aqueous solution in 1 liter of distilled water.

It is understood that the foregoing detailed description is given merely by way of illustration and that many variations may be made therein without departing from the spirit of my invention.

Having described my invention, what I desire to secure by letters Patent is:

1. In a method of determining the concentration of glutamic-oxalacetic transaminase in a body fluid by contacting said body fluid with a mixture of L-aspartic acid, α-ketoglutaric acid and a buffer adapted to maintain the pH between 7 and 7.5 at a temperature between about 25° C. and about 40° C. for 15 to about 30 minutes and then adding a diazonium salt to develop a visible color, the improvement which comprises acidifying the colored mixture obtained to give a pH of not more than 2.5 before measuring the depth of color formed.

2. A method according to claim 1 wherein said acidification is effected with a mineral acid.

3. A method according to claim 2 wherein said mineral acid is employed in a concentration of 0.01 to 0.05 N.

4. In a method of determining the concentration of glutamic-oxalacetic transaminase in a body fluid by contacting said body fluid with a mixture of L-aspartic acid, α-ketoglutaric acid and a buffer adapted to maintain the pH between 7 and 7.5 at a temperature between about 25° C. and about 40° C. for about 15 to about 30 minutes and then adding a diazonium salt to develop a visible color, the improvement which comprises acidifying the colored mixture obtained in the presence of a nonionic surface active agent to give a pH of not more than 2.5 before measuring the depth of color formed.

5. A method according to claim 4 wherein said acidification in the presence of nonionic surface active agent is effected with a 0.02 N aqueous mineral acid containing 0.5 to 1% by weight of ethoxylated fatty alcohol.

6. A method according to claim 4 wherein said acidification in the presence of nonionic surface active agent is effected with a 0.02 N aqueous mineral acid containing 0.5 to 1% by weight of ethoxylated octylphenol.

7. A method according to claim 4 wherein said acidification in the presence of nonionic surface active agent is effected with a 0.02 N aqueous mineral acid containing 0.5 to 1% by weight of polyoxyethylene sorbitan monoleate.

8. A method according to claim 4 wherein said acidification in the presence of nonionic surface active agent is effected with a 0.02 N aqueous mineral acid containing 0.5 to 1% by weight of a nonionic surface active agent comprising tridecyl alcohol condensed with 6 to 10 mols of ethylene oxide.

9. A method according to claim 4 wherein said acidification in the presence of nonionic surface active agent is effected with a 0.02 N aqueous mineral acid containing 0.5 to 1% by weight of a nonionic surface active agent comprising octylphenol condensed with 40 mols of ethylene oxide.

References Cited by the Examiner
UNITED STATES PATENTS

| | | | |
|---|---|---|---|
| 3,002,893 | 10/61 | Babson | 195—103.5 |
| 3,069,330 | 12/62 | Babson | 195—103.5 |

A. LOUIS MONACELL, *Primary Examiner.*

ALVIN E. TANENHOLTZ, *Examiner.*